United States Patent Office 2,957,832
Patented Oct. 25, 1960

2,957,832

CELLULAR POLYURETHANE ELASTOMER AND PREPARATION OF SAME USING PYRIDINE CATALYST

George T. Gmitter and Edwin M. Maxey, Akron, Ohio, assignors to The General Tire & Rubber Company, Akron, Ohio, a corporation of Ohio No Drawing. Filed Dec. 5, 1956, Ser. No. 626,296

8 Claims. (Cl. 260—2.5)

This invention relates to polyester and/or polyether diisocyanate foams and more particularly to the use of catalysts in the production of foams having excellent resiliency.

In the ordinary method of making cellular polyurethane or foamed polyester diisocyanate reaction products, a viscous, non-linear liquid polyester is pumped at a controlled rate through a nozzle. An organic polyisocyanate, preferably a diisocyanate having two and only two isocyanate groups, is pumped, but at extremely high pressure, to the nozzle, where it contacts the stream of polyester and is thoroughly mixed therewith because of its high velocity. A small amount of water is also introduced into the nozzle either as a stream or in admixture with the polyester. A suitable cross-linking agent, such as 1,3-propylene glycol, and a reaction catalyst, such as certain tertiary alkyl amines, are also generally mixed with the polyester or introduced into the nozzle along with an emulsifying agent in order to obtain good dispersion of the catalysts. A stirrer is also generally present in the nozzle to insure homogeneous mixing. From the nozzle, the material is incorporated into a suitable mold, such as an open pan, which is moved in a continuous manner relative to the nozzle to provide the desired layer of viscous reactants on the bottom of the pan or mold.

Polymerization starts as the materials are mixed and the semi-fluid mass is discharged from the nozzle. The mixing of the material is very important. It is essential that the diisocyanate and catalyst be almost immediately and completely dispersed in the polyester. The rate of polymerization is relatively fast and the mass is shaped by the contour of the pans. Carbon dioxide is evolved in the gaseous state from the time of mixing so that the bubbling and frothing occurs during the mixing, discharging and shaping stages. The resultant foamed product is thereafter heated to cure the product.

Another method of producing polyurethane foam products is to dissolve or disperse an easily liquefied gas such as a Freon in the polyester and using the Freon gas as a means of blowing the polyurethane. This method of producing excellent light-density foams is described in the U.S. application, Serial No. 541,823, filed October 20, 1955, now abandoned, of Charles B. Frost, and assigned to the assignee of the present application.

In the past great difficulties have been encountered in the production of cellular polyurethane materials since the resultant polyurethane lacked some of the desirable properties of sponge rubber, such as resiliency and resistance to humidity aging. Resiliency in a sponge material may be provided by closed cells containing entrapped air or gas as well as by flexibility of the material. Generally the rupture of the cells by wringing or by passing the material between close fitting rolls or surfaces moving at the same speed causes great decrease in their resiliency, which is a serious limitation to their use. In the case of polyester-diisocyanate foams, it has been thought impossible to produce a foam with both good resiliency and resistance to humidity aging.

It is important that a reaction catalyst be provided to accelerate the polyester-diisocyanate reaction so that linear growth of the polymer will be fast enough to change the polymer from the liquid state to the gelled state in order to entrap any gas evolved.

Ordinary tertiary amines such as tripropylamine have been used as catalysts and were found to be effective and very quick acting. The products produced, however, have lacked resilience, particularly after wringing of the material to provide open cell structure required for "breathing," which is so desirable in cushion material. The products also have deteriorated badly when aged under conditions of high humidity, particularly at elevated temperatures.

It is an object of the present invention to provide a polyurethane foam with properties of superior resiliency and resistance to humidity aging and which is formed by a process in which the isocyanate-ester reaction takes place in a reasonable time.

It is a further object to provide a process for producing a polyurethane foam that has good resiliency even after wringing to break closed cells and provide breathability.

It is still another object to provide a process for making foam with better resiliency and better resistance to steam aging than those heretofore produced.

We have found that certain amine type catalysts, which are characterized by a cyclic structure (preferably unsaturated) consisting solely of carbon atoms and nitrogen atoms as the cyclic chain, such as pyridine, when substituted for all or part of the tertiary alkyl amine catalysts ordinarily used, greatly influence and enhance the resiliency of the foamed product.

We have also found that the reaction catalysts apparently act not only to accelerate the formation of the linear polyurethane chain but also to accelerate its decomposition when it is subjected to high humidity particularly at elevated temperatures. We have further found that the catalyst or residual catalysts present after formation of the polyurethane foam can be largely removed by wringing the cured foam at elevated temperatures to displace gas and gaseous catalyst from the pores, and that such a polyurethane sponge has much improved aging.

Unexpectedly, the resiliency of polyurethane sponge produced with the above catalysts is, after wringing, equal to, or in many cases, increased over the resiliency before wringing and flexing. The foamed material is also preferably heated between each cycle of wringing in order to more readily volatilize and eliminate remaining catalysts so that the catalysts are no longer present to catalyze the reverse reaction. The wringing thus imparts good humidity aging resistance to the foamed material.

The porous material is prepared by mixing an excess of an organic diisocyanate with a suitable polyester and/or polyether in the presence of a small amount of water to react with the isocyanate and produce carbon dioxide gas, and thereafter curing the foam material thus produced.

The reaction is accelerated, in accordance with this invention, by a catalyst which comprises, at least in part, a tertiary amine catalyst having a cyclic structure consisting solely of carbon atoms and nitrogen atoms in the chain itself, such as a pyridine. The cellular foam reaction product is thus cured by heat to render it rubbery and tack-free, and then preferably wrung or cracked so as to make the cured foam "breathable," which property is so desirable in cushioning materials such as mattresses.

The active hydrogen compound used to react with the organic diisocyanate is preferably selected from a member of the group consisting of dihydroxy polyesters and dihydroxy polyethers. Suitable polyesters and polyethers are thus described in the previously mentioned application of Charles B. Frost or in United States Patent No. 2,577,279, to Simon et al. The rigidity of the foam is largely controlled by the amount of cross-linking or trifunctional reactants present in the polyester and isocyanate.

In general cross-linking type polyesters or polyethers with substantial amounts of trifunctional material to promote branching are used for rigid foamed urethanes. More linear polyesters or polyethers, with molecular weights preferably from about 1500 to 2500 are generally used for producing the flexible cellular polyurethane rubbers. Generally polyethers are preferred for superior humidity aging resistance and low temperature flexibility although excellent humidity resistance may be obtained with polyesters when the new catalysts are used as herein set forth.

In accordance with the present invention, molecular weight of the polyester may be as low as 500 to 600 to obtain some benefits of the invention, although the product tends to be more rigid than one produced with high molecular weights. Molecular weights as high as 3000 or 4000, or even higher, may be used, although the expense of producing polyesters with molecular weights much over 5000 is generally prohibitive. The polyester preferably has a hydroxyl number of about 40 to 80 and no acid number, or a low acid number, such as one that is less than 10.

All or part of the polyesters used in the examples may be substituted by polyethers. Suitable polyethers for use in obtaining improved polyurethane foams are polyalkylene ether glycols such as the mixed polyglycol of ethylene-propylene, polytetramethylene glycol, polypropylene glycol, and polyethylene glycol, etc., the latter of which is sold under the name of "Carbowax 1000" and has a molecular weight of about 1000. Polyethers are preferred which have a molecular weight above 700 but those with a molecular weight as low as 500 to 600, or as high as 5000 or even somewhat higher may be used, depending upon the type of improved foamed product desired. Other suitable polyethers besides the aforementioned mixed polyalkylene ether glycols such as poly (ethylene-propylene) ether glycols are polytrimethylene ether glycol, polyneopentylene ether glycol, and polypentamethylene ether glycol and mixtures of these. Best results are obtained with a polypropylene or higher glycol having a molecular weight of 2000 to 3000.

The main portion of the polyisocyanate compounds for non-rigid foams are those having two, and only two, active isocyanate groups.

Examples of some of the suitable diisocyanates are:

Tolylene diisocyanate;
p,p'-Diisocyanate diphenyl methane;
Naphthalene 1,5-diisocyanate;
Metaphenylene diisocyanate;
Bitolylene diisocyanate;
Hexamethylene diisocyanate; and
Durene diisocyanate.

Some triisocyanates may be used in conjunction with one or more of the above when more rigidity is desired or when the polyether or polyester has insufficient trifunctionality to give the desired degree of branching.

A small amount of water is added to provide $CO_2$ gas from its reaction with isocyanate groups in excess over those required for reaction with the polyester or polyether. The formation of the $CO_2$ provides the expansion necessary to form a foam. Preferably the blowing action for the foam is provided by dispersing or dissolving an easily liquefied alkane gas such as dichlorofluoromethane in the polyester which changes from the liquid to gaseous state upon reaching room temperature or below as described in the previously mentioned application of Charles B. Frost.

The catalyst is found, as before stated, to make a profound difference in humidity aging and flexibility after cells have been ruptured by wringing. The catalysts which provide this new result are tertiary amine compounds having a cyclic structure composed of nitrogen and carbon atoms and preferably containing benzoid or ring unsaturation such as a pyridine structure. It is important that the cyclic chain be composed only of nitrogen and carbon atoms in order to obtain benefits of the present invention. The tertiary amine compound may contain an oxygen atom located on a hydrocarbon chain which is substituted for a hydrogen of the pyridine ring such as 4-pyridine propanol and the pyridine ring is preferably substituted by a hydrocarbon chain which may or may not contain an oxygen atom. Suitable compounds are 4-pyridine propanol, 4-n amyl pyridine, 2-pyridine ethanol and 2-pyridine propanol. The length of the hydrocarbon radical is preferably at least 2 carbon atoms.

Other compounds having a cyclic structure consisting solely of carbon and nitrogen atoms impart good resilient properties to cellular polyurethane elastomers. Generally these compounds, however, such as N,N'-dialkyl piperazines including N,N'-dimethyl piperazine and N,N'-diethyl piperazine are somewhat inferior to the pyridine type catalysts since they are slower acting and generally much more expensive.

The pyridine compound is preferably volatile at a temperature less than 300° F. to 400° F. so that it can be driven off easily and removed from the foamed product during the heating and wringing cycles.

When the hydrocarbon radical that is substituted for a hydrogen of the pyridine ring has a free oxygen atom or hydroxyl group such as an ethanol or propanol group, the humidity aging resistance of the product is exceptional since the free oxygen apparently reacts with the diisocyanate and/or polyester after accelerating the polyurethane formation and is thus not present to later hydrolyze and degrade the foamed product under conditions of high humidity.

The tertiary amine catalysts of the present invention, in which the nitrogen is preferably part of an unsaturated ring structure, impart improved resiliency to foamed polyurethane material even when used in amounts as low as 0.5 part by weight based on the weight of the active hydrogen compound and the polyisocyanate. The preferred range to obtain maximum benefits is about 1 to 3 parts by weight, although as high as 5 parts by weight may be used before properties of resiliency and humidity aging start to decrease greatly, and before the odor imparted to the foam by the catalyst becomes objectionable.

The pyridine compound catalysts are effective in improving resiliency and humidity aging even when amounts of 0.5 part by weight based on the weight of the polyester and diisocyanate, and amounts as high as 5 parts can be used before decreasing the humidity aging resistance and resiliency properties, although the catalysts are preferably used in the range of 1 to 3 parts in order to obtain maximum resiliency and still provide good resistance to humidity at high temperatures.

The pyridine compound catalysts are slower acting than alkyl amines such as tripropylamine so that mixtures of pyridine compound catalysts and ordinary tertiary amines may be preferred in order to promote chain growth quickly enough to effectively trap the blowing gas to form a light density foamed structure and still impart superior properties of resiliency and humidity aging to the foamed product.

Emulsifiers are preferably used with the pyridine compound catalysts so as to obtain good dispersion to catalyze reaction and the emulsifiers may be non-ionic, anionic or cationic in nature. The purpose of the emulsifier is to control the foaming velocity during the formation stage.

As previously described, the foamed polyurethane is produced by thorough mixing of the polyester or polyether and the diisocyanate. A suitable compound for producing the blowing action, such as water or difluoromonochloromethane, is also mixed in along with a cross-linking catalyst and the pyridine compound catalyst of the present invention. The foamed reaction product is thermoplastic in nature and should be changed to thermosetting in nature by heating the product to cure it and give it the desired rubbery elastic properties. A temperature of around 200° F. to 250° F. or 275° F. is usually used for curing the foam and curing time is usually 3 to 8 hours at the elevated temperature.

After curing beyond the tacky state, the sponge product is preferably subjected to a wringing or cracking operation such as passing it between tight rolls of a calendar mill in order to break bubbly and closed cell structure to make the foamed material more breathable. A large number of closed cells are produced and wringing is preferred to make a breathable product.

Generally a more uniform product is prepared by controlling the temperature of the reactants which is preferably close to 72° F. Best results are obtained by preventing contamination of the diisocyanate of polyester with moisture or the mixing thereof. While the temperatures of the receiving pans are not critical they should be in the range of 72° F. to 95° F. in temperature. The cure should be full and complete to insure full benefits of the present invention and the cure time is generally from 3 to 6 hours, although it depends upon the exact formulation and conditions of curing. An inadequate cure may provide poor aging and setting properties and any additional heat does not seem to overcure the foam and cause a resultant loss of desirable properties.

The foamed materials of the present invention are preferably formed by first reacting a polyester and/or polyether with a substantial excess of a diisocyanate over a 1:1 molar ratio in the absence of any water so as to form a flowable or viscous dry partially reacted "pre-polymer" so that there are free isocyanate groups present. Subsequently, the dry "pre-polymer" is reacted with water, a cross-linking agent containing a plurality of labile hydrogens, and a tertiary amine catalyst of the present invention. There is a minimum of agitation after the initial dispersion of water in the pre-polymer to prevent the loss of $CO_2$. The amount of water used is generally about .1 to 3 parts by weight based on 100 parts of pre-polymer to provide $CO_2$ for a low density product, although as low as 0.5 part by weight can be used to obtain benefits of this invention. When more than 5 parts are used, the urea linkage formed apparently cause a decrease in the resiliency of the foamed product.

The foams of the present invention may be produced by the use of fillers, or antioxidants such as organic phosphites, plasticizers, or other additives.

EXAMPLE 1

Polyurethane foams were prepared by mixing the following formulae with an air stirrer in half-gallon containers:

82 grams (about 68 ml.) polyester
29.5 grams (about 24.5 ml.) tolylenediisocyanate
Amine and activator as indicated The polyester used is the reaction product of about 1 mol adipic acid, 1 mol diethylene glycol, and about 1/30 mol of trimethylol propane, which latter provides for branching and cross-linking during the subsequent reaction with diisocyanate. The viscosity of the polyester is held between 1000 and 1100 centipoises per second at 73° C.; its moisture content is below 2% and preferably is varied between 0.3 and 0.5%, and it has predominantly hydroxyl end groups.

The foamed products were formed by the liberation of $CO_2$ from the reaction of water and isocyanate groups of the diisocyanate. Results of tests conducted on the foamed products are found in Table I.

*Table I*

| Tertiary Amine Catalyst | Amount (grams) | Activator | Foam Time (mins.) | Percent Compression Set (B) | Percent Rebound | | 25% Comp. Defl.—10 sq. in.— | |
|---|---|---|---|---|---|---|---|---|
| | | | | | 0W | 35W | 0W | 35W |
| 4-pyridine propanol | 1.0 | B | 5 | 12.1 | 35 | 36 | }fissure | |
| | 1.5 | B | 2 | 9.4 | 32 | 35 | | |
| 4-n Amyl pyridine | 1.0 | B | 4 | 7.3 | 32 | 38 | 48 | 30 |
| | 1.5 | B | 1.5 | 8.5 | 35 | 36 | 48 | 27 |
| 2-ethanol pyridine | 1.0 | B | 8 | 14.4 | 35 | 38 | }small fissure | |
| | 1.5 | B | 5 | 15.1 | 33 | 37 | | |
| 2-propanol pyridine | 1.0 | B | 7 | 12.1 | 36 | 38 | }fissure | |
| | 1.5 | B | 4 | 13.1 | 36 | 37 | | |

NOTES:
(a) Activator B comprises:
   1.6 grams water
   1.0 grams Igepal CO-630
   0.1 gram Aerosol OT—100%
   2.7 grams Total
(b) 0W in table designates no wringing.
   35W designates 35 passes through wringer.

It is noted in Table I that the foamed polyurethane materials have better resilient properties after wringing and flexing.

In the above table, Igepal CO-630 is nonyl phenoxy polyoxyethylene ethanol sold by General Aniline & Film Co., and Aerosol-OT is sodium dioctyl sulfosuccinate sold by the American Cyanamid Co.

Other catalysts can, of course, be used in conjunction with one or more of the above pyridine compounds if desired. Thus, one can also use in admixture with those herein described, one or more of the catalysts described in our copending applications of even date herewith and respectively designated:

Cellular Polyurethane Composition and Method of Making Same, Serial No. 626,315, filed December 5, 1956
Polyalkylene Ether Glycol-Diisocyanate Cellular Elastomers, Serial No. 626,313, filed December 5, 1956
Catalysts Used in Preparation of Cellular Polyurethane Elastomers, Serial No. 626,314, filed December 5, 1956

Mixtures of catalysts usually permit one to obtain faster reactions without elimination of the specific advantage produced by each.

Furthermore, it is to be understood that in accordance with the provisions of the patent statutes, the particular form of product shown and described and the particular procedure set forth are presented for purposes of explanation and illustration and that various modifications of

Having thus described our invention, we claim:

1. In the method of making a polyurethane foamed material wherein polyurethane forming reactants comprising (1) a hydroxy terminated polyol having a molecular weight of at least 500 and being selected from the group consisting of a polyalkylene ether glycol and a polyester having an acid number less than 10 and being the reaction product of a polycarboxylic acid and a polyhydric alcohol, (2) an organic polyisocyanate in an amount in excess of that required to react with the hydroxyl end groups of said polyol, and (3) water as a blowing agent in an amount sufficient to form a foamed polyurethane are mixed to form a cellular polyurethane, the improvement which comprises additionally mixing with said polyol, polyisocyanate and blowing agent from about 0.5 to 5.0 parts by weight per 100 parts by weight of said polyol and said polyisocyanate of a catalyst having the formula

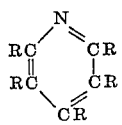

where R is selected from the group consisting of alkyl radicals, hydroxy alkyl radicals and hydrogen atoms, said alkyl and hydroxy alkyl radicals having from 2 to 5 carbon atoms and 4 of said R radicals being hydrogen and one of said R radicals being of the group consisting of said alkyl radicals and said hydroxy alkyl radicals, and thereafter repeatedly wringing the resulting foamed material at elevated temperature below 300° F. to break closed cells and to remove gas and remaining catalyst.

2. In the method of making a polyurethane foamed material wherein polyurethane-forming reactants comprising (1) a hydroxy terminated polyol having a molecular weight of from 500 to 5,000 and being selected from the group consisting of a polyalkylene ether glycol and a polyester having an acid number less than 10 and being the reaction product of a polycarboxylic acid and a polyhydric alcohol, (2) an organic polyisocyanate in an amount in excess over that required to react with the hydroxyl end groups of said polyol, and (3) from 0.5 to 5 parts by weight of water per 100 parts by weight of said polyol and said polyisocyanate are reacted to form a cellular polyurethane material, the improvement which comprises mixing with said polyol, polyisocyanate and water from about 0.5 to 5.0 parts by weight per 100 parts by weight of said polyol and said polyisocyanate of a catalyst having the formula

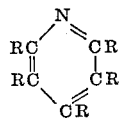

where R is selected from the group consisting of alkyl radicals, hydroxy alkyl radicals and hydrogen, said alkyl and hydroxy alkyl radicals having from 2 to 5 carbon atoms and 4 of said R radicals being hydrogen, and one of said R radicals being of the group consisting of said alkyl radicals and said hydroxy alkyl radicals, and thereafter repeatedly wringing and heating the resulting foamed material at an elevated temperature below 300° F. to break closed cells and to remove gas and residual volatile catalyst.

3. In the method of making a polyurethane foamed material wherein polyurethane-forming reactants comprising (1) a hydroxy terminated polyol having a molecular weight of from about 1,500 to 2,500 and being selected from the group consisting of a polyalkylene ether glycol and a polyester having an acid number less than 10 and being the reaction product of a polycarboxylic acid and a polyhydric alcohol, (2) an aromatic diisocyanate in an amount in excess over that required to react with the hydroxyl end groups of said polyol, and (3) from about 1 to 3 parts by weight of water per 100 parts by weight of said polyol plus said diisocyanate are reacted to form a cellular polyurethane material, the improvement which comprises mixing with said polyol, polyisocyanate and water from about 1 to 3 parts by weight based on 100 parts by weight of said polyol and said diisocyanate of a catalyst having the formula

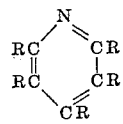

where R is selected from the group consisting of alkyl radicals, hydroxy alkyl radicals and hydrogen, said alkyl and hydroxy alkyl radicals having from 2 to 5 carbon atoms and 4 of said R radicals being hydrogen atoms, and one of said R radicals being of the group consisting of said alkyl and said hydroxy alkyl radicals, and thereafter repeatedly wringing and heating the resulting foamed material at an elevated temperature below 300° F. to rupture closed cells to make the foamed material breathable and to remove gas and remaining volatile catalyst.

4. In the method of making a polyurethane foamed material wherein polyurethane-forming reactants comprising (1) a prepolymer of the reaction of (A) a hydroxy terminated polyol having a molecular weight of from about 1,500 to 2,500 and being selected from the group consisting of a polyalkylene ether glycol and a polyester having an acid number less than 10 and being the reaction product of a polycarboxylic acid and a polyhydric alcohol with (B) an aromatic diisocyanate in an amount in excess over that required to react with the hydroxyl end groups of said polyol, and (2) from about 1 to 3 parts by weight of water per 100 parts by weight of said prepolymer are reacted together to form a cellular polyurethane material, the improvement which comprises mixing with said prepolymer and water from about 1 to 3 parts by weight based on 100 parts by weight of said prepolymer of a catalyst having the formula

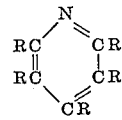

where R is selected from the group consisting of alkyl radicals, hydroxy alkyl radicals and hydrogen, said alkyl and hydroxy alkyl radicals having from 2 to 5 carbon atoms, and 4 of said R radicals being hydrogen and one of said R radicals being of the group consisting of said alkyl and said hydroxy alkyl radicals, and thereafter repeatedly wringing and heating the resulting foamed material at an elevated temperature below 300° F. to rupture closed cells and to remove gas and remaining volatile catalyst.

5. In the method according to claim 1, the use of 2-ethanol pyridine as said catalyst.

6. In the method according to claim 1, the use of 4-propanol pyridine as said catalyst.

7. The product produced by the method of claim 1.

8. In the method according to claim 1, the use of n-amyl pyridine as said catalyst.

References Cited in the file of this patent

UNITED STATES PATENTS

| | | |
|---|---|---|
| 1,045,234 | Willis et al. | Nov. 26, 1912 |
| 2,650,212 | Windemuth | Aug. 25, 1953 |

OTHER REFERENCES

Heiss et al.: "Industrial and Engineering Chemistry," pages 1498–1503, volume 45, No. 7, July 1954.